United States Patent
Wu et al.

(10) Patent No.: US 8,229,370 B2
(45) Date of Patent: Jul. 24, 2012

(54) AUTOMATED POWER CONTROL TO OPTIMIZE POWER CONSUMPTION AND IMPROVED WIRELESS CONNECTION

(75) Inventors: Mario Wu, Alhambra, CA (US); Makoto Nakayama, Woodland Hills, CA (US); John Guo, Oak Park, CA (US); Jack Lieng, Chatsworth, CA (US); Walter Lee, Rosemead, CA (US)

(73) Assignee: Minebea Co., Ltd., Nagano-Ken (JP)

( * ) Notice: Subject to any disclaimer, the term of this patent is extended or adjusted under 35 U.S.C. 154(b) by 551 days.

(21) Appl. No.: 12/401,570

(22) Filed: Mar. 10, 2009

(65) Prior Publication Data

US 2010/0233975 A1  Sep. 16, 2010

(51) Int. Cl.
*H04B 17/00* (2006.01)
*H04B 1/04* (2006.01)

(52) U.S. Cl. ............ 455/83; 455/127.1; 455/115.1

(58) Field of Classification Search ......... 455/115.1, 455/127.1, 130, 73–88
See application file for complete search history.

(56) References Cited

U.S. PATENT DOCUMENTS

| | | | |
|---|---|---|---|
| 7,680,462 B2 * | 3/2010 | Wong et al. | 455/78 |
| 8,019,289 B2 * | 9/2011 | Gorbachov | 455/83 |
| 8,073,401 B2 * | 12/2011 | Gorbachov | 455/83 |
| 2009/0251221 A1 * | 10/2009 | Gorbachov | 330/301 |

OTHER PUBLICATIONS

Product Data Sheet, CC2430, "A True System on Chip Solution for 2.4 GHZ IEEE 802.15.4/Zigbee". Texas Instruments, CC2430 Data Sheet (rev.2.1)—Jan. 2010.

* cited by examiner

*Primary Examiner* — Dinh T. Le
(74) *Attorney, Agent, or Firm* — George B. F. Yee; Fountainhead Law Group P.C.

(57) ABSTRACT

A method for automatically adjusting signal output power of a ZigBee wireless module. The method includes sending a signal with an output power from a transmitter of a ZigBee module to a receiver. The ZigBee module includes a power amplifier/low noise amplifier (PA/LNA) circuit. The output power can be adjusted between a minimum level and a maximum level. Additionally, the method includes generating a Link Quality Indicator (LQI) by the receiver based on the signal strength and returning the LQI to the ZigBee module. If the LQI is not within a predetermined range between a maximum value and a minimum value, the method includes adjusting the output power for sending next signal. If the output power from the transmitter has reached to the minimum level or the maximum level, the method further includes adjusting the PA/LNA circuit of the ZigBee module for maintaining the LQI within the predetermined range.

22 Claims, 7 Drawing Sheets

AUTOMATED POWER CONTROL TO OPTIMIZE POWER CONSUMPTION AND IMPROVED WIRELESS CONNECTION

BACKGROUND OF THE INVENTION

The invention is directed to a method for automatic output power control of signal transmission between two network modules. Merely by way of example, the invention has been applied to control signal output power for a ZigBee module with optimized power consumption and improved wireless connection. But it would be recognized that the invention has a much broader range of applicability.

In networking communication application where a signal is sent out from a transmitter to a receiver, it is generally preferred that the transmitter is able to send the signal with an optimum output power so that the signal is sent with substantial power saving while having still sufficient strength at the receiver side to make a successful communication with an expected or valid quality. Especially for wireless technology, power saving would be an important concern for many field applications because most of field-deployed wireless modules are just powered by non-rechargeable batteries and expected to sustain their operations for long time. ZigBee wireless technology compliant with IEEE 802.15.4 standard is a low-cost, low-power, wireless mesh networking standard. The low cost feature allows the technology to be widely deployed in wireless sensor control and monitoring applications, the low power-usage feature allows longer life with smaller batteries, and the mesh networking feature provides high reliability and larger range. However, the mesh topology also has several draw backs. For example, it has higher communication overhead associated with increased latency and lower end-to-end performance compared to other type of networking topology such as star topology. In general, the meshed routing requires more complex network protocols, which means the routers require more embedded resources resulting in increased power consumption for each ZigBee module.

ZigBee protocols with embedded applications require lower data rates and much lower power consumption through network designs to conserve the power in slave nodes, comparing to other wireless technology such as Wi-Fi and Bluetooth. Further reducing transmission power consumption without sacrificing wireless connection quality, however, is still an important task. It is seen that techniques or methods for optimizing signal output power for ZigBee module with improved receiving sensitivity at the same time are highly desired. It would provide a beneficial basis for additional improvement in many ZigBee wireless communication and signal remote sensing applications.

BRIEF SUMMARY OF THE INVENTION

The invention is directed to a method for automatic output power control of signal transmission between two network modules. Merely by way of example, the invention has been applied to control signal output power for a ZigBee module with optimized power consumption and improved wireless connection. But it would be recognized that the invention has a much broader range of applicability in both wired or wireless network communication and sensor remote control applications.

In a specific embodiment, the present invention provides a method for automatically adjusting signal output power and receiving sensitivity of a ZigBee module. The method includes sending a signal with an output power from a transmitter of a ZigBee module to a receiver. The ZigBee module includes PA/LNA circuit having a power amplifier and a low noise amplifier. The output power from the transmitter can be adjusted between a minimum level and a maximum level. The signal has a signal strength measured at the receiver. Additionally, the method includes generating a Link Quality Indicator (LQI) by the receiver based on the signal strength. The method further includes receiving a return message by the ZigBee module, where the return message includes information of the LQI. If the LQI is not inclusively within a predetermined range between a maximum value and a minimum value, the method includes adjusting the output power for sending next signal. If the output power from the transmitter has reached to the minimum level or the maximum level, the method further includes adjusting the PA/LNA circuit of the ZigBee module for maintaining the LQI within the predetermined range.

In another specific embodiment, the present invention provides a method for automatic adjusting output power of a wireless signal sent from a first wireless module to a second wireless module. The method includes receiving a first packet with a first signal strength by a second wireless module. The first packet is sent with a first transmit power by the first wireless module. Each of the first wireless module and the second wireless module is associated with a PA/LNA circuit comprising a power amplifier PA and a low noise amplifier LNA for additionally adjusting signal output power. The method further includes determining whether a link quality indicator (LQI) based on the first signal strength is between a low threshold and a high threshold. If the LQI is determined to be greater than the high threshold, the method includes determining whether the first transmit power is set to a minimum level. Furthermore, if the first transmit power is higher than the minimum level, the method includes reducing the first transmit power to a second transmit power for sending a second packet from the first wireless module. If the first transmit power is set to the minimum level, the method includes further determining whether the PA/LNA circuit associated with the first wireless module is in ON state. If the PA/LNA circuit is in OFF state, the method also includes displaying a first warning message indicating that no further power saving for the first wireless module. Moreover, if the PA/LNA circuit is in ON state, the method includes turning off the PA before sending a third packet with a third transmit power. The third transmit power is smaller than the first transmit power.

In yet another specific embodiment, the method further includes determining whether the first transmit power is set to a maximum power if the LQI is determined to be less than the low threshold. If the first transmit power is less than the maximum level, the method then includes increasing the first transmit power to a fourth transmit power for sending a fourth packet from the first wireless module. If the first transmit power is set to the maximum level, then the method includes determining whether the PA/LNA circuit associated with the first wireless module is in ON state. If the PA/LNA circuit is in OFF state, the method includes turning on the PA before sending a fifth packet with a fifth transmit power which is greater than the first transmit power. If the PA/LNA circuit is in ON state, the method further includes displaying a second warning message indicating that the second wireless module is too far apart from the first wireless module.

In an alternative embodiment, the present invention provides a testing system of using a power amplifier/low noise amplifier (PA/LNA) circuit for automatic adjusting output power of a ZigBee module. The testing system includes a first personal computer (PC) and a second PC. Each PC has a RS232 communication port. The testing system further includes a first ZigBee module and a second ZigBee module. Each ZigBee module includes a PA/LNA circuit between a Balun port of internal transmitter/receiver and an input/output port. The first ZigBee module is connected to the RS232 communication port of the first PC and the second ZigBee module is connected to the RS232 communication port of the second PC. Additionally, the testing system includes a RF Attenuator respectively connected to the first ZigBee module via a first RF cable and to the second ZigBee module via a second RF cable to simulate a change of distance between the first ZigBee module and the second ZigBee module. Moreover, the testing system includes an application software loaded in both the first PC and the second PC. The application software includes one or more codes to control each of the first ZigBee Module and the second ZigBee module for performing an automated test of output power adjustment of the first ZigBee module to send a signal to the second ZigBee module while maintaining an link quality indicator associated with the signal within a valid range.

In another alternative embodiment, the present invention provides a firmware of ZigBee module for automatically adjusting signal output power. The firmware includes a computer code embedded in a ZigBee module configured to process a receiving strength of a wireless signal packet to determine whether a link quality indicator (LQI) is within a valid range between a low threshold and a high threshold. Additionally, the firmware includes a computer code for instructing the ZigBee module to increase transmitter output power till reaching a maximum level if the LQI is less than the low threshold. The firmware further includes a computer code for instructing the ZigBee module to turn on a power amplifier/low noise amplifier (PA/LNA) circuit for maintaining the LQI within the valid range by boosting signal output power. Furthermore, the firmware includes a computer code for instructing the ZigBee module to decrease transmitter output power till reaching a minimum level if the LQI is greater than the high threshold. Moreover, the firmware includes a computer code for instructing the ZigBee module to further turn off the PA/LNA circuit, if it is in ON state, for maintaining the LQI within the valid range.

Many benefits can be achieved through the application of embodiments of the present invention. The power amplifier and low noise amplifier (PA/LNA) circuit added between a Balun port of a ZigBee module (e.g., CC2430 provided by Texas Instrument) transmitter/receiver and its wireless antenna can provide additional power adjustment for the module. In an embodiment, using the PA/LNA circuit for power adjustment can be achieved by switching on the PA connection associated with the ZigBee for transmitting or turning off the PA simply via a bypass circuit using one or two RF switches. In another embodiment, the same ZigBee module with the PA/LNA circuit can receive the signal with enhance signal sensitivity by switching on the corresponding LNA connection. Embodiments of the present invention provide a testing system for performing an automated test process for output power adjustment of a ZigBee module having the PA/LNA circuit. An application software for executing the automated test process can be loaded into a typical PC computer and displayed in graphical manner. Other embodiments of the present invention provide a method for auto-adjusting signal power sent from the ZigBee module for achieving best effort power saving without sacrificing signal communication quality. These and other benefits may be described throughout the present specification and more particularly below.

DETAILED DESCRIPTION OF THE INVENTION

The invention is directed to a method for automatic output power control of signal transmission between two wireless network module. Merely by way of example, the invention has been applied to control signal output power for a ZigBee networking module with optimized power consumption and improved wireless connection. But it would be recognized that the invention has a much broader range of applicability.

Figure 1:
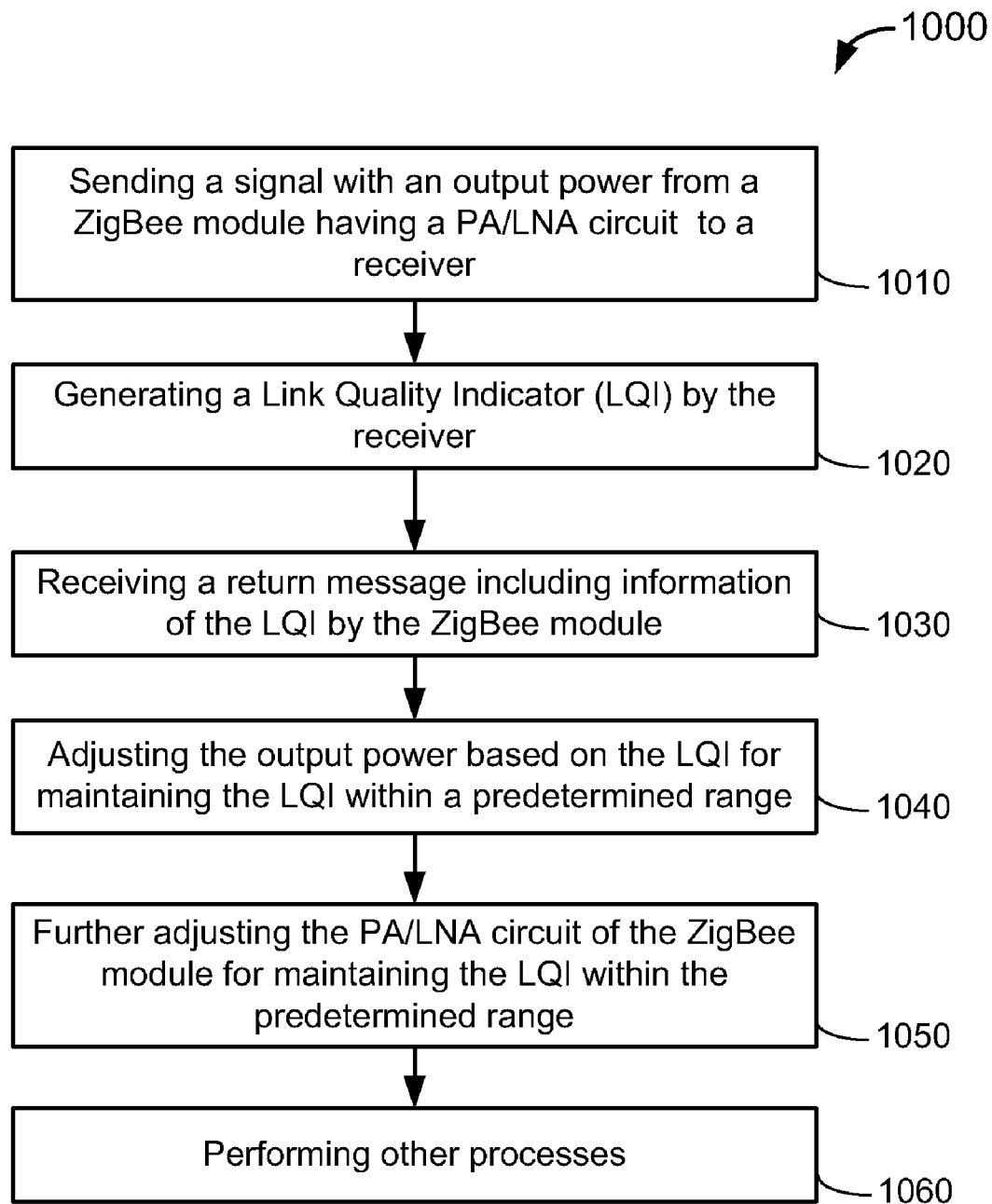
FIG. 1 is a simplified flow chart illustrating a method for automatically adjusting signal output power of a ZigBee module according to an embodiment of the present invention.

FIG. 1 is a simplified flowchart illustrating a method for automatically adjusting signal output power of a ZigBee module according to an embodiment of the present invention. This diagram is merely an example, which should not unduly limit the scope of the claims herein. The method 1000 includes the following steps:

1. Step 1010 for sending a signal with an output power from a ZigBee module having a PA/LNA circuit to a receiver;
2. Step 1020 for generating a Link Quality Indicator (LQI) by the receiver;
3. Step 1030 for receiving a return message including information of the LQI by the ZigBee module;
4. Step 1040 for adjusting the output power based on the LQI for maintaining the LQI within a predetermined range;
5. Step 1050 for further adjusting the PA/LNA circuit of the ZigBee module for maintaining the LQI within the predetermined range;
6. Step 1060 for performing other steps.

The above sequence of processes provides a method of adjusting signal transmission power of a ZigBee module based on receiving signal strength in terms of a link quality indicator (LQI) according to an embodiment of the present invention. The method also includes using a PA/LNA circuit associated with the ZigBee Module to adjust the output power additionally for maintaining the LQI within a valid value range. Other alternatives can also be provided where some steps are added, one or more steps are removed, or one or more steps are provided in a different sequence without departing from the scope of the claims herein. For example, if the LQI value is still outside the valid range when the ZigBee module internal transmission power has reached its limit and the use of the PA/LNA circuit has been applied, the ZigBee module may have to broadcast a message on failure to provide further saving in power or a warning signal indicating that the ZigBee module is too far from a receiver. Further detail descriptions of the method can be found throughout the present specification and more particularly below.

Figure 2:
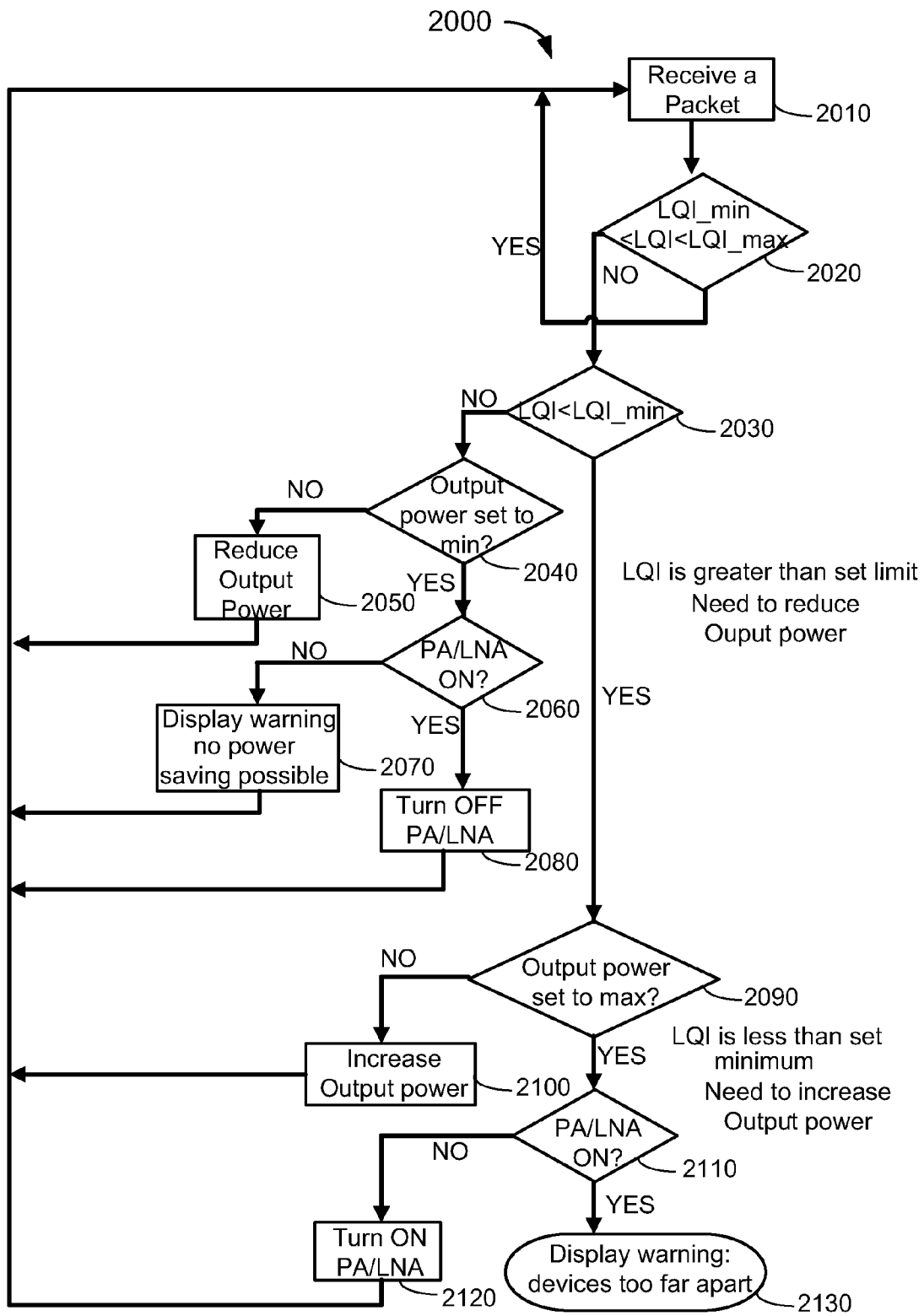
FIG. 2 is a simplified firmware flow chart for performing automated adjustment of signal output power for a ZigBee module using a PA/LNA circuit according to an embodiment of the present invention.
Figure 3:
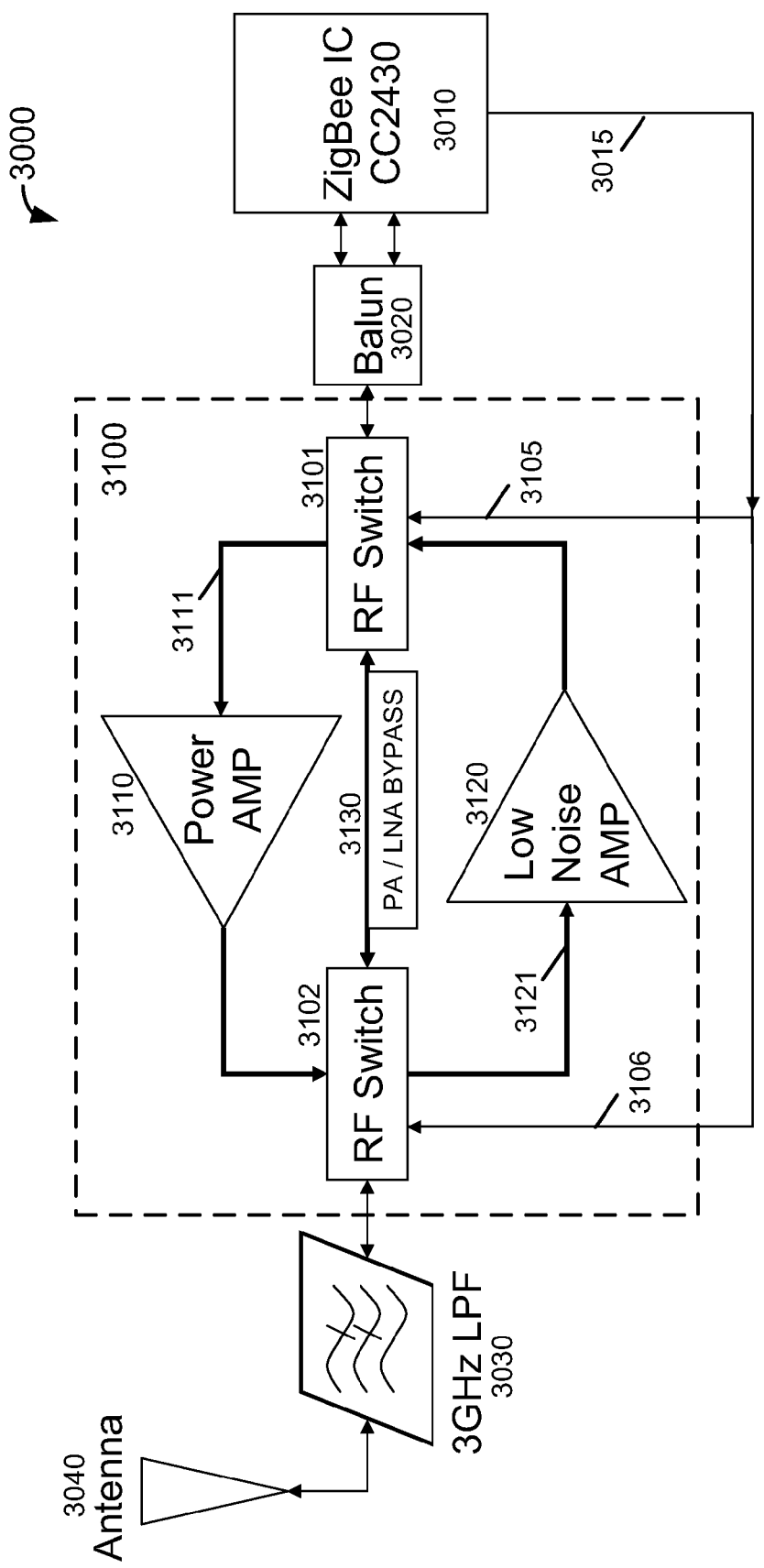
FIG. 3 shows a simplified block diagram of the ZigBee module integrated with a PA/LNA circuit comprising a power amplifier (PA) and a low noise amplifier (LNA) according to an embodiment of the present invention.

In an specific embodiment, the method 1000 is implemented as a firmware embedded inside a ZigBee module, which can be applied automatically during wireless signal transmission between the ZigBee module and a wireless signal receiver. FIG. 2 is a simplified flow chart of the firmware for performing automated adjustment of signal output power for a ZigBee module using a PA/LNA circuit according to an embodiment of the present invention. This diagram is merely an example, which should not unduly limit the scope of the claims herein. One of ordinary skill in the art would recognize many variations, alternatives, and modifications. Further detailed description of FIG. 2 will be given below in association with FIG. 1. Additionally, the ZigBee module associated with the application of the method 1000 is integrated with the PA/LNA circuit coupled between a Balun port of internal transmitter/receiver and a RF antenna. As an example, FIG. 3 shows a simplified block diagram of the ZigBee module integrated with a PA/LNA circuit comprising a power amplifier (PA) and a low noise amplifier (LNA) according to an embodiment of the present invention. This diagram is merely an example, which should not unduly limit the scope of the claims herein. One of ordinary skill in the art would recognize many variations, alternatives, and modifications. In particular, as an example, by implementing the firmware 2000 as shown in FIG. 2 loaded in a ZigBee module 3000 as shown in FIG. 3, the method 1000 according to an embodiment of the present invention can be demonstrated specifically below.

As shown in FIG. 3, ZigBee module 3000 is shown to include a standard ZigBee IC 3010. For example, the ZigBee IC is CC2430 system-on-chip solution for 2.4 GHz IEEE 802.15.4/ZigBee™ transceiver provided by Texas Instruments. In other example, the ZigBee IC can be other module including new generation 2.4 GHz ZigBee/IEEE 802.15.4 RF transceiver. The ZigBee IC 3010 uses a Balun port 3020 for handling impedance matching of an outgoing/incoming signal from/into the Zigbee IC 3010. The Balun port 3020 is coupled between the ZigBee IC 3010 (linked to either an internal transmitter or receiver) and an external PA/LNA circuit 3100 via a first RF switch 3101. The PA/LNA circuit 3100 is further coupled to a low pass filter (LPF) 3030 via a second RF switch 3102. The LPF 3030 is directly linked to a RF antenna 3040 for sending/receiving the outgoing/incoming signal. The PA/LNA circuit 3100 is an external power control circuit including a power amplifier (PA) 3110 and a low noise amplifier (LNA) 3120 associated with an ON state of the PA/LNA circuit 3100 and a bypass circuit 3130 associated with an OFF state of the PA/LNA circuit 3100. The PA/LNA circuit 3100 at the ON state is capable of using the PA 3110 to enhance power of the outgoing signal transmitted from an internal transmitter of the ZigBee IC 3010 by switching the first RF switch 3101 to a PA path 3111, or capable of using the LNA 3120 to boost signal quality of the incoming signal by switching the second RF switch 3102 to a LNA path 3121. The PA/LNA circuit 3100 at the OFF state simply let the outgoing/incoming signal to go through the Bypass line 3130. The ON or OFF state of the PA/LNA circuit 3100 is realized by correspondingly adjusting the first switch 3101 and the second RF switch 3102, both of which are controlled by a firmware embedded inside the ZigBee IC 3010. The firmware is configured to send a driving signal through a link 3015 to control the first RF switch 3101 via a side path 3105 or to control the second RF switch 3102 via another side path 3106. In an embodiment, the firmware embedded in the ZigBee IC 3010 includes the firmware 2000 shown in FIG. 2 for automatically controlling output power of ZigBee signal based on its link quality at the receiving side. Of course, there can be other alternatives, variations, and modifications.

Referring to FIG. 1, the method 1000 for automatically adjusting signal output power of a ZigBee module includes process 1010 of sending a signal with an output power from a ZigBee module having a PA/LNA circuit to a receiver. In an implementation, the ZigBee module 3000 comprising the PA/LNA circuit 3100 can be used. In a specific embodiment, the signal can be generated by the internal transmitter of a ZigBee IC module and is processed by the PA/LNA circuit 3100 before sending out with a certain power level via a RF antenna which has been configured to have a 2.4 GHz working frequency compatible with ZigBee wireless protocol compliant with IEEE 802.15.4. The signal is expected to be detected by the receiver which may be disposed at a distance away from the ZigBee module 3000 and has been also configured to be compatible with the ZigBee wireless protocol.

In wireless communications, a received radio signal usually can be characterized by a power level or signal strength detected by the receiver in terms of a Received Signal Strength Indication (RSSI), a generic radio receiver technology metric. In an IEEE 802.11 system RSSI can be a value varying from 0 to 255 in arbitrary units depending on the vendor. In an implementation for applying embodiments of the present invention, the RSSI is stored on the receiver RX descriptor and is measured by baseband and PHY for each received signal packet. In an example, a receiver module substantially the same as the ZigBee module 3000 serves as the receiver to store a RSSI value in its RX descriptor for the received signal sent from the ZigBee module 3000. In particular, a firmware embedded in the receiver module should be able to handle the signal processing, storing, and associated calculation to determine the RSSI value of the specific packet. Referring to FIG. 2, this corresponds to executing step 2010 of the firmware 2000, which has been loaded into the ZigBee IC of the receiver module as described in previous paragraphs.

Referring to FIG. 1, the method 1000 includes a next process 1020 of generating a Link Quality Indicator (LQI) by the receiver. This step can be visually corresponded to executing step 2020 of the firmware 2000. Particularly, it includes at least performing a calculation process based on the measured RSSI value of the received signal packet. Depending on embodiments, the so-called LQI is a constant specifically used as one of several ways for characterizing a communication link quality between a transmitter and a receiver. In general signal quality can be determined by measuring, assessing, and analyzing all link parameters including signal strength (e.g., RSSI), bit error ratio (BER), and the levels of the ratio of signal-plus-noise-plus-distortion to noise-plus-distortion (SINAD), and so on. LQI derived from measured RSSI value can be defined by:

$$LQI = \frac{(MA\_C\_SPEC\_ED\_MAX(RSSIdBm - ED\_RF\_POWER\_MIN\_dBm)}{(ED\_RF\_POWER\_MAX - dBm - ED\_RF\_POWER\_MIN\_dBm)}$$

This definition for LQI and associated parameters can be found in file mac_radio.c of the Texas Instruments ZigBee stack. Of course, there can be many other ways to define the LQI, which should not unduly limit the scope of the claims herein. One of ordinary skill in the art would recognize many variations, alternatives, and modifications. In an implementation, a valid range of the LQI value can be set in terms of a lower boundary (or low threshold) of 70 and a higher boundary (or high threshold) of 110. Both of the parameters can be stored in the RX descriptor of the receiver module. Again, the valid range of LQI can be set in different manner. For example, ZigBee IC may be able to detect a lowest quality data frames with LQI=50.

Therefore, step 2020 of the firmware 2000 includes performing an evaluation or determination process to check if the LQI value for the received signal is inclusively within the valid range defined above. In an implementation of an embodiment of the present invention, the evaluation process is performed by the receiver module. In an alternative implementation, the receiver module, once obtained the LQI value for the signal packet, can embed the LQI value in a return signal message. The receiver module, which is also capable of transmitting signal (for example, the receiver module can be another ZigBee module substantially similar to ZigBee module 3000), just sends this return signal back to the ZigBee module 3000 so that the information about the LQI value for the received signal from the receiver perspective is delivered to the ZigBee module as a transmitter and stored in its (TX) descriptor. Then the transmitting ZigBee module can perform an evaluation process to determine if the LQI value is within the valid range (provided that the low and high threshold value have been pre-saved in it descriptor).

In one example, the return signal can used a data format defined as: TZ.x.yyy.zz.000.cccc, which can be also used as data format for original signal sent or subsequent signal to be sent by the ZigBee module 3000. Here in the data format, TZ represents a command code. x indicates PA/LNA circuit at ON state (or enabled) with a value of "1" and OFF state with "0". The value of x is updated by both transmitting ZigBee module and receiver module when the respective PA/LNA circuits are enabled. yyy is just an embedded value for LQI and can be updated by both transmitter and receiver when new message is received. For example, yyy corresponds a LQI value of 90 from a receiver perspective. When the transmitter got the return signal, the transmitter automatically updates its LQI value and stored in its (TX) descriptor. zz is a value of the output power used by the device. Of course, zz also can be updated by both transmitter and receiver with its respective output power settings when transmitting a packet. Further, the value of cccc can be updated, but only by the transmitter (i.e., the device that sends this particular data packet).

Therefore, the method 1000 further includes process 1030 of receiving a return message including information of the LQI by the ZigBee module. This process is substantially the same as executing step 2020 of the firmware 2000 described above or at least an immediate next one or more steps following step 2020 depending on different scenarios. In a first scenario, the LQI value is determined to be inclusively within the valid range from 70 to 110. This can be either done by the receiver module which then pass the information to transmitting ZigBee module or done by the transmitter module after received message from the receiver module including the LQI value. The transmitting ZigBee module then typically can remain its original operation of sending any next signal packet without adjusting output power. In some implementations, if LQI is within the valid range but near high threshold, the transmitting ZigBee module may try to lower the output power, by performing a subsequent process 1040 in method 1000. Of course, there can be alternatives, variations, and modifications.

In a second scenario as the result of executing step 2020, the LQI value is found to be outside the valid range of 70-110, and particularly by further executing step 2030 of the firmware 2000 the LQI value is determined to be greater than the high threshold 110. In an specific embodiment, when executing process 1030 of the method 1000 if a (transmitting) ZigBee module received a return message including information about the LQI value being greater than high threshold, the next process 1040 of the method 1000 for adjusting the output power for maintaining the LQI within the valid range would be triggered as shown in FIG. 1. Particularly in this case, process 1040 would try to reduce power for any signal next to be sent by the transmitting module. Alternatively, in a third scenario as the result of executing step 2020, the LQI value is found to be smaller than the low threshold 70 by further executing step 2030 of the firmware 2000. In this case, process 1040 of the method 1000 would try to increase power for any signal next to be sent by the transmitting module. For example, the transmitting module is the ZigBee module 3000. More descriptions about above different scenarios can be found in more details below.

Referring to FIG. 2, in the second scenario when the LQI value is determined to be greater than the high threshold 110 at step 2030, step 2040 of the firmware 2000 is executed within the transmitting ZigBee module to determine whether the transmission power from its internal transmitter is set to allowed minimum power level. In this scenario LQI value suggests that the transmission power of a signal may uses too much power, or in another words, the output power can be reduced to save energy (or battery power) while still achieving a desired signal link quality. In an example, the transmitting ZigBee module is the ZigBee module 3000 including a ZigBee IC module 3010 shown in FIG. 3. The ZigBee IC module 3010 includes a built-in RF transceiver or transmitter/receiver (not explicitly shown in FIG. 3) that is configured to be operable of transmitting signals with certain output power levels preset according to a set of predetermined values depending on specific chip design. For example, Table I shows a preset output power values in dBm for a ZigBee IC. In this Table the associated binary TXCTRLL register values and device current consumptions in units of mA are also shown respectively at each preset output power level.

TABLE I

| Output power (dBm) | TXCTRLL register value | Device current consumption (mA) |
|---|---|---|
| 0.6 | 0xFF | 32.4 |
| 0.5 | 0xDF | 31.3 |
| 0.3 | 0xBF | 30.3 |
| 0.2 | 0x9F | 29.2 |
| −0.1 | 0x7F | 28.1 |
| −0.4 | 0x5F | 26.9 |
| −0.9 | 0x3F | 25.7 |
| −1.5 | 0x1F | 24.5 |
| −2.7 | 0x1B | 23.6 |
| −4.0 | 0x17 | 22.8 |
| −5.7 | 0x13 | 21.9 |
| −7.9 | 0x0F | 21.0 |
| −10.8 | 0x0B | 20.1 |
| −15.4 | 0x07 | 19.2 |
| −18.6 | 0x06 | 18.8 |
| −25.2 | 0x03 | 18.3 |

Therefore, by executing step 2040 of the firmware 2000 the output power level of the current signal packet transmitted by the internal transmitter can be determined if it has reached the lowest preset level, i.e., −25.2 dBm with a corresponding register value 0×03 following the Table I by the transmitting ZigBee module 3000. If the current power level is not at the lowest level yet, then step 2050 of the firmware 2000 would be executed to reduce the output power level for transmitting any next signal packet. In an implementation, the power reduction can be done by adjusting the transmitter device driving current to reduce the transmitter chip output power stepwise following the Table I accordingly. Of course, there can be alternative ways to reduce the transmission power or other modifications, variations. Following the power reduction step, the firmware 2000 can be resumed back to the starting step 2010 of receiving a (new) signal packet transmitted out of the ZigBee IC module (3010) with the reduced output power set in step 2050. Subsequent steps will be the same as described before (see FIG. 2). Please note, this is referred to the process 1040 of the method 1000 for adjusting the output power based on the LQI to maintain the LQI within a predetermined range.

Referring back to FIG. 2, in the third scenario when the LQI value is determined to be smaller than the low threshold 70 at step 2030, step 2090 of the firmware 2000 is executed within the transmitting ZigBee module to determine whether the transmission power from its internal transmitter is set to allowed maximum power level. In this scenario, the LQI value indicate the signal link quality has been poorer than desired level, increasing signal output power would be an immediate solution for boosting signal strength at the receiver and correspondingly boosting the link quality. In an implementation, the transmitting power level of the internal transmitter in the ZigBee IC module 3010 may be raised to provide a higher signal output power. In particular, the transmitting power level can be adjusted stepwise following a preset series of power levels, e.g., the Table I as an example. Step 2090 is to determined if the transmitting power level has been at the highest output level, e.g., 0.6 dBm with a corresponding TXCTRLL register value of 0xFF.

If the transmitter output power is not yet at the maximum level 0xFF allowed by the ZigBee IC module, then the next step 2100 of the firmware 2000 can be executed to increase the output power by raising the transmitter power to a level higher for sending any next signal packet by the internal transmitter of the ZigBee IC module. In an example, the Table I again can be used for the ZigBee IC module to increase its transmitter power. Of course, there can be other alternatives, variations, and modifications. Following the power increase at step 2100, the firmware 2000 can be resumed back to the starting step 2010 of receiving a (new) signal packet transmitted out of the ZigBee IC module (3010) with the increased output power set in step 2090. Subsequent steps will be the same as described before (see FIG. 2). Please note, this also is referred to process 1040 of the method 1000 for adjusting the output power based on the LQI to maintain the LQI within a predetermined range.

Referring to FIG. 1 again, the method 1000 includes a process 1050 of further adjusting the PA/LNA circuit of the ZigBee module for maintaining the LQI within the predetermined range. This step (1050) can also be illustrated through one or more executing steps of firmware 2000 shown in FIG. 2. In an example, in the second scenario that the LQI value is determined to be greater than the high threshold 110 at step 2030, step 2040 of the firmware 2000 further determines that the output power has been adjusted to reach its minimum power level allowed for the transmitting ZigBee IC module. For example, the output power level becomes −25.2 dBm with TXCTRLL register value of 0x03 if Table I is used by the ZigBee IC module 3010. In this case, functions of the PA/LNA circuit of the ZigBee module 3000 will be triggered automatically for additional power adjustment aiming to turn the LQI value into the valid operation range.

In an specific embodiment of the present invention in terms of the method 1000, the firmware 2000 embedded in the ZigBee IC module 3010 would first perform a step 2060 to verify whether the PA/LNA circuit 3100 (coupled to the ZigBee IC module 3010, as seen in FIG. 3 and described in earlier paragraphs) is turned ON or OFF with a bypass circuit 3130 being used. In an implementation, at step 2060 the transmitting ZigBee IC module 3010 may sense how the RF switches 3101 and 3102 are operated respectively, leading to either the PA path 3111 associated with PA 3110 being used or the bypass circuit 3130 being used. In another implementation, the receiver can be also a ZigBee module the same as the ZigBee module 3000. Then at the step 2060 its corresponding ZigBee IC module may sense how the RF switches 3101 and 3102 are operated respectively to lead either to the LNA path 3121 associated with LNA 3120 or to the bypass circuit 3130.

If the step 2060 determines that the PA/LNA circuit 3100 is turned ON following a result of step 2040 that the transmitting output power has been at the minimum level allowed, the ZigBee module 3000 then can trigger a next step 2080 of the firmware 2000 that is embedded in ZigBee IC module 3010. At step 2080, the ZigBee IC module 3010, as shown in FIG. 3, can send control signal 3105 and 3106 respectively to the RF switch 3101 and 3102 to turn OFF the PA/LNA circuit 3100 that couples to the ZigBee IC module 3010. In particular, for the transmitting ZigBee module 3000, turning the PA/LNA circuit 3100 to an OFF state can further reduce the output power level of a signal that is transmitted out of the RF antenna 3040. Basically, at the OFF state, the bypass circuit 3130 is used. Thus the overall power saving is achieved. In an alternative case, for the receiver that is substantially another ZigBee module 3000, turning the PA/LNA circuit OFF by executing step 2080 can also help to reduce LQI value and save power.

If step 2060 determines that the PA/LNA circuit 3100 is turned OFF already following a result of step 2040 that the transmitting output power has been at the minimum level allowed, the ZigBee module 3000 then may, at least temporarily, exhaust its capability to further reduce output power of the transmitting signal for achieving more favorable power saving. Then the firmware 2000 would trigger next step 2070 to let the ZigBee module to broadcast a message: no more power saving is possible. Step 2070 can be executed in terms of a screen display showing on monitor of central control system. Step 2070 may include sending out a wireless message including the no-power-saving information. Of course, there can be many variations, alternatives, and modifications. Please note, this is referred to, at least partially, process 1050 of the method 1000 for further adjusting the PA/LNA circuit of the ZigBee module for maintaining the LQI within the predetermined range. Examples of using the PA/LNA circuit for automatic output power adjustment in a ZigBee module testing system can be found in more details below.

Referring still to FIG. 1, process 1050 of the method 1000 further is performed in the third scenario that the LQI value is determined to be smaller than the low threshold. Again, this step 1050 can also be illustrated through one or more executing steps of firmware 2000 shown in FIG. 2. As shown in an example, the LQI value is determined to be smaller than the low threshold 70 at step 2030 and the output power of the transmitter is further determined to have been at the maximum level allowed for the transmitting ZigBee IC module by executing step 2040 of the firmware 2000. For example, the output power level becomes 0.6 dBm with TXCTRLL register value of 0xFF if Table I is used by the ZigBee IC module 3010. In this case, functions of the PA/LNA circuit of the ZigBee module 3000 will be triggered automatically for additional power adjustment aiming to turn the LQI value into the valid operation range.

In an specific embodiment of the present invention in terms of the method 1000, the firmware 2000 embedded in the ZigBee IC module 3010 would first perform step 2110 to verify whether the PA/LNA circuit 3100 (coupled to the ZigBee IC module 3010, as seen in FIG. 3 and described in earlier paragraphs) is turned ON or OFF with a bypass circuit 3130 being used. In an implementation, at the step 2110 the transmitting ZigBee IC module 3010 may sense how the RF switches 3101 and 3102 are operated respectively, leading to a connection between the Balun port 3020 and RF antenna 3040 (via a LPF 3030) that is through either the PA path 3111 associated with PA 3110 or the bypass circuit 3130. In another implementation, the receiver can be also a ZigBee module the same as the ZigBee module 3000. Then at step 2110 the receiver's corresponding ZigBee IC module may sense how the RF switches 3101 and 3102 are operated respectively to lead either to the LNA path 3121 associated with LNA 3120 or to the bypass circuit 3130.

If step 2110 determines that the PA/LNA circuit 3100 is not turned ON following a result of the step 2090 that the transmitting output power has been at the maximum level allowed, the ZigBee module 3000 then can trigger a next step 2120 of the firmware 2000 that is embedded in ZigBee IC module 3010. At step 2120, the ZigBee IC module 3010, as shown in FIG. 3, can send control signal 3105 and 3106 respectively to the RF switch 3101 and 3102 to turn ON the PA/LNA circuit 3100 that couples to the ZigBee IC module 3010. In particular, for the transmitting ZigBee module 3000, turning the PA/LNA circuit 3100 to an ON state can simply use the power amplifier PA 3110 to further enhance the output power level of a signal from the internal transmitter of ZigBee IC module 3010. From the perspective of a receiver, the signal strength should be enhanced due to the enhanced output power of the signal that is transmitted out of the RF antenna 3040. As the result, the signal link quality in terms of the LQI value can be raised accordingly. In an alternative aspect, for the receiver that is substantially another ZigBee module 3000, turning ON the PA/LNA circuit by executing step 2120 can also help to raise signal sensitivity by using a low noise amplifier LNA 3120, thereby helping to increase the LQI value.

If step 2110 determines that the PA/LNA circuit 3100 is turned ON already following a result of step 2090 that the transmitting output power has been at the maximum level allowed, the ZigBee module 3000 then may, at least temporarily, exhaust its capability to further enhance output power of the transmitting signal for achieving required link quality between the ZigBee module and the receiver. Then the firmware 2000 would trigger next step 2130 to let the ZigBee module to broadcast a warning message: devices may be too far apart. Step 2130 can be executed in terms of a screen display showing on monitor of central control system. Step 2130 may include sending out a wireless message including the warning information or other instructions for relocating the devices or rerouting the network if possible. Of course, there can be many variations, alternatives, and modifications. Please note, this is also referred to, at least partially, process 1050 of the method 1000 for further adjusting the PA/LNA circuit of the ZigBee module for maintaining the LQI within the predetermined range. Examples of using the PA/LNA circuit for automatic output power adjustment in a ZigBee module testing system can be found in more details below.

FIG. 1 further listed a process 1060 of the method 1000 for performing other processes to adjust output power of ZigBee module. These processes may include operating the receiver's ZigBee IC module based on firmware 2000 to calculate the signal strength to determine LQI value, or to process the sensing signal to identify the status of the RF switches, or to generate control signals for turning ON/OFF of the PA/LNA circuit, or to monitor the operation of associated power amplifier PA and/or low noise amplifier LNA within the PA/LNA circuit. Of course, there can be many alternatives, variations, and modifications. For example, some steps of adjusting output power of a transmitter may be performed before or after the steps of adjusting the PA/LNA circuit coupled to the transmitter. In other examples, the two ZigBee modules can serves either a transmitting module or a receiving module during the communications so that the steps of adjusting the PA/LNA circuit should apply to both transmitting ZigBee module or receiving ZigBee module.

Figure 4:
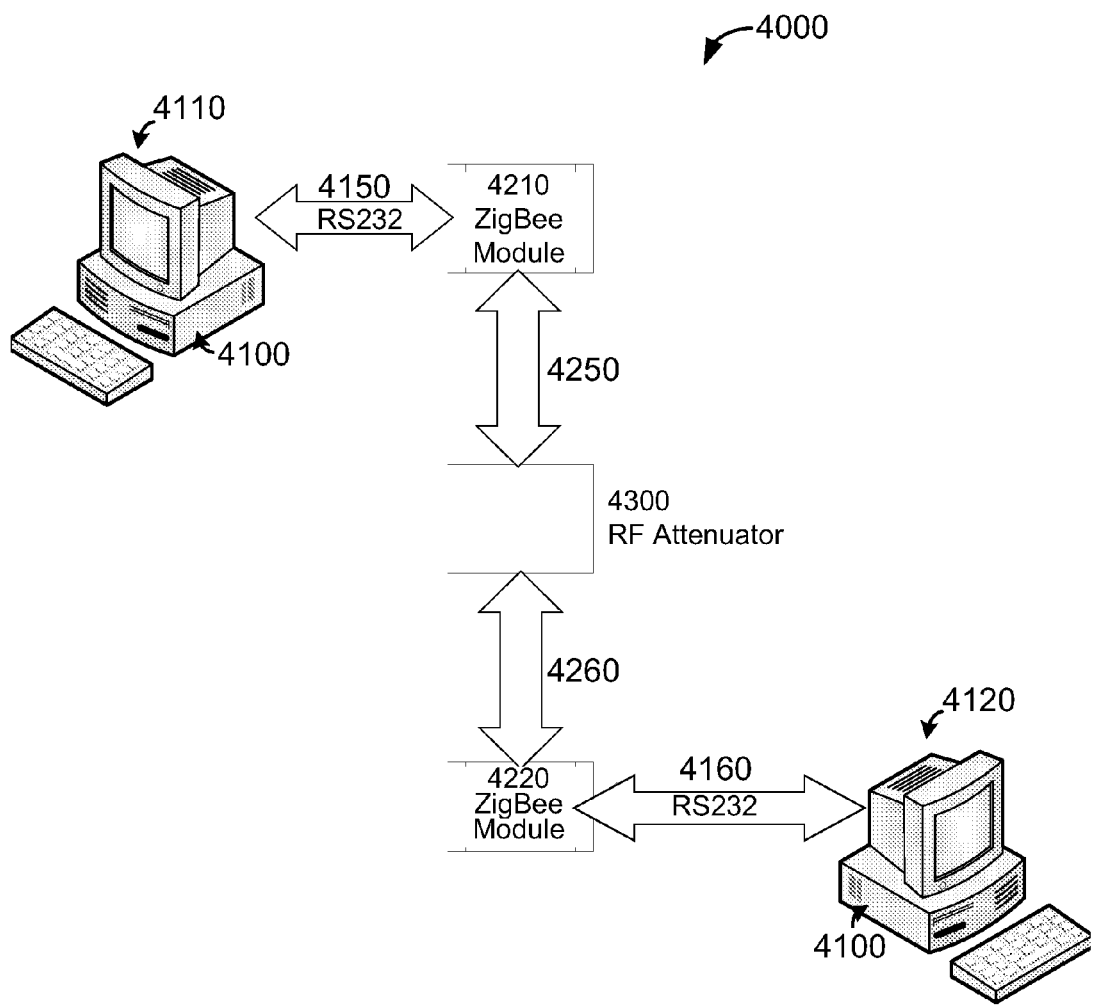
FIG. 4 is a simplified diagram illustrating a testing system for automatically adjusting output power of a ZigBee module using a PA/LNA circuit according to an embodiment of the present invention.

In an alternative embodiment, the present invention also provides a ZigBee module testing system for testing the automatic output power adjustment using an external power amplifier or low noise amplifier circuit. FIG. 4 is a simplified diagram illustrating a testing system for automatic adjusting output power of a ZigBee module using a PA/LNA circuit according to an embodiment of the present invention. This diagram is merely an example, which should not unduly limit the scope of the claims herein. One of ordinary skill in the art would recognize many variations, alternatives, and modifications. As shown, a testing system 4000 for testing the signal output power adjustment between two ZigBee modules includes a first ZigBee module 4210 and a second ZigBee module 4220. Either one of them can serve as a transmitter while the other serves as a receiver. The testing system 4000 includes a first personal computer PC 4110 coupled to the first ZigBee module 4210 via a RS-232 communication link 4150 and a second personal computer PC 4120 coupled to the second ZigBee module 4220 via a RS-232 communication link 4160. The testing system 4000 is configured, in terms of testing operation, to load an application software 4100 to each of the first PC 4110 and the second PC 4120. The testing system 4000 is further configured, in terms of physical structure, to link the first ZigBee module 4210 to a RF attenuator 4300 via a RF cable 4250 and to further link the RF attenuator 4250 to the second ZigBee module 4220 via another RF cable 4260. The RF attenuator 4300 is configured to add loss (or power attenuation) to the signals sent from the first ZigBee module 4210 to the second ZigBee module 4220, thereby simulating a varying distance between a transmitting ZigBee module and a receiving ZigBee module. The ZigBee module used here can be the same as the ZigBee module 3000 shown in FIG. 3 that has an ZigBee IC module embedded with a firmware 2000.

In an example, the application software 4100 for conducting the testing of automatic output power adjustment for the ZigBee module can use RS232 protocol. In particular, the test includes an operation of turning ON or OFF of a PA/LNA circuit associated with corresponding ZigBee module. Communication commands can be inserted in each PC (4110 or 4120) depending on the test details. For example, TZ1 is defined as to start the PA/LNA automated test and TZ2 to terminate the PA/LNA automated test. Correspondingly, a packet with a format like: TZ.x.yyy.zz.000.cccc, as described in earlier specification can be sent or received by corresponding transmitting ZigBee module or receiving ZigBee module. The RS232 COM port of both PCs can have a port setting as follows, as an example:

| | |
|---|---|
| Baud Rate | 115200 bps |
| Data Bits | 8 |
| Parity | None |
| Stop Bits | 1 |
| Flow Control | None |
| COM Port | COM1 (or others depending on specific PC hardware) |

In particular, the application software 4100, loaded on either PC (4110 or 4120), includes a graphical user interface that can update the above COM port settings and generate one or more messages to be sent from one ZigBee module to another and receive one or more returned messages from the other. In one example, under Send message window of the user interface, user can enter the command to start or stop the automated test. Under Receive Message window of the same user interface, the formatted incoming message is shown.

During the test, the RF attenuator 4300 is tuned to reduce the transmitted signal strength for simulating a farther distance between the devices under test. Effectively, the link quality indicator (LQI) associated with each ZigBee module from a receiver perspective (here referred to the second ZigBee module 4220) is calculated at each specific setting of the RF attenuator 4300 and specific output power level of the transmitted ZigBee module (here referred to the first ZigBee module 4210). As the first ZigBee module 4210 receive a returned message from the second ZigBee module 4220, an output power to send next signal by the first ZigBee module 4210 can be automatically adjusted. In an embodiment, the method 1000 is used to perform the automated power adjustment including turning on or off a PA/LNA circuit associated with each ZigBee module. In an example, the PA/LNA circuit used in the ZigBee module under test is the same as the PA/LNA circuit 3100 shown in FIG. 3.

In an implementation, a valid range of the LQI value for the test is set between 70 and 110. Therefore, the tests are intended for illustrating how the PA/LNA circuit is used to control the output power or signal sensitivity to maintain the LQI value within the set range of 70 and 100. For example, when the ZigBee module obtains a LQI value smaller than 70, the testing system 4000 would increase its transmitting power until it has reached a maximum level allowed and further adjust its output power by turning on the PA/LNA circuit. When the ZigBee module obtains a LQI value greater than 110, the testing system 4000 would reduce the output power until it has reached a minimum level allowed and further adjust power level by turning off the PA/LNA circuit.

Embodiments of the present invention in terms of conducting automated power adjustment test using the test system 4000 include at least three separate tests. Each of them illustrates an element of the automation process to keep good communication link between two ZigBee devices with desirable power savings whenever possible. In an specific embodiment, each of the two ZigBee devices under these tests is the same as the ZigBee module 3000 including the ZigBee IC module 3010 embedded with a firmware 2000 and an external PA/LNA circuit 3100 mediated between the ZigBee IC module 3010 and a RF antenna. More details of these examples can be shown specifically below.

Figure 5:
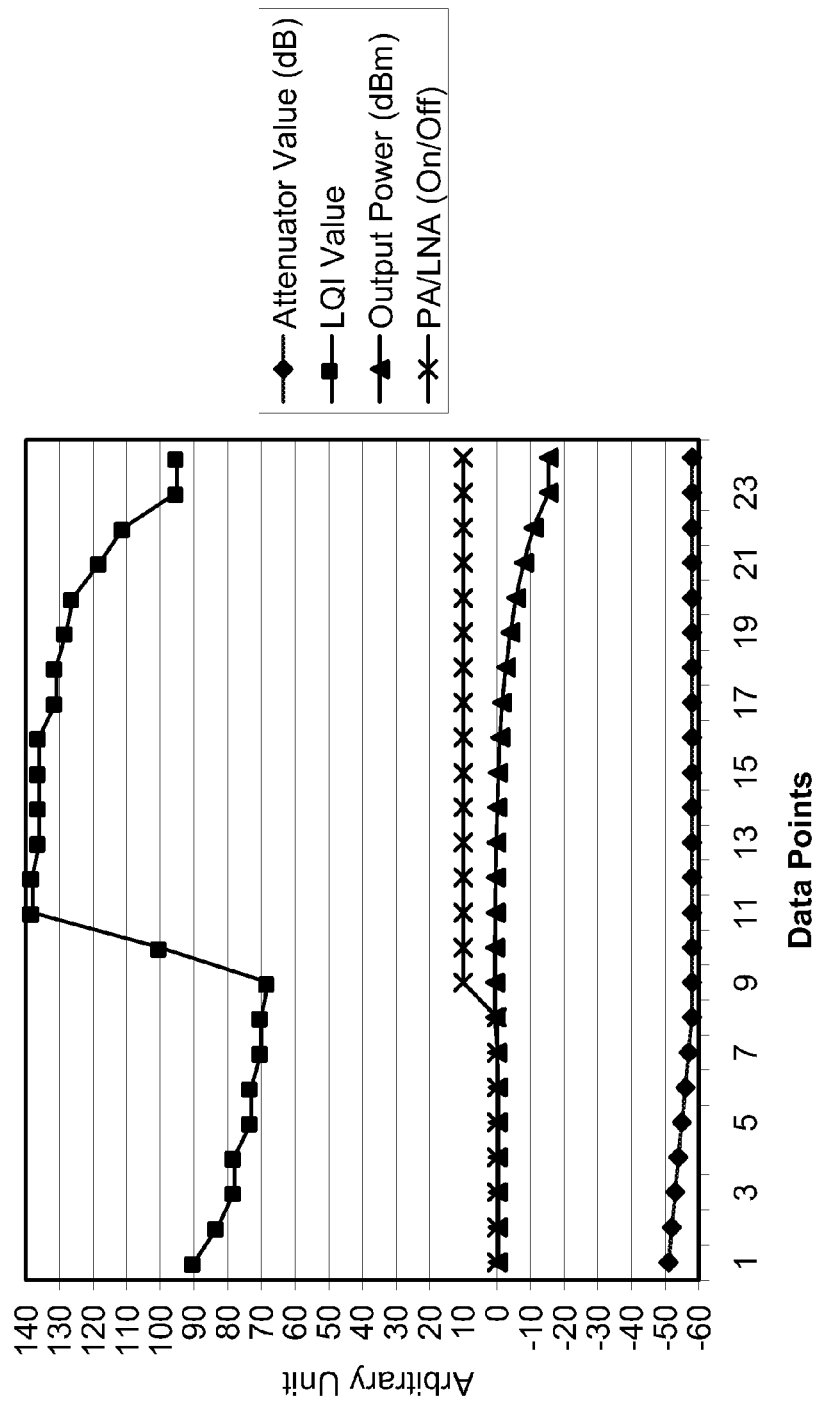
FIG. 5 is a chart illustrating an embodiment of using the testing system shown in FIG. 4 by turning on the PA/LNA circuit for maintaining LQI within the valid range.

FIG. 5 is a chart illustrating an embodiment of using the testing system shown in FIG. 4 by turning on the PA/LNA circuit for maintaining LQI within the valid range. This diagram is merely an example, which should not unduly limit the scope of the claims herein. One of ordinary skill in the art would recognize many variations, alternatives, and modifications. As shown, the Test 1 simulates a scenario of turning on PA/LNA circuit to keep LQI value within the valid range. In particular, FIG. 5 shows a plot of a plurality of test data points, each corresponding to a state associated with a transmitter having a specific output power, a receiver for giving a specific LQI value, attenuation value to simulate the transmitter and the receiver moving apart, and an ON/OFF state of the PA/LNA circuit. After starting, the attenuator increases attenuation value stepwise (i.e., as a larger negative value marked as a diamond shape). At data point #9, the LQI value (marked as square shape) becomes smaller than 70. In this test, the output power of the transmitter (in a CC2430 IC module), marked as triangle shape, has reached the maximum. This triggers turning ON of the PA/LNA circuit. As a result, the LQI value at very next data point increases and reaches to 100, returning back to the valid range of 70 and 100. This demonstrates that as the devices moves apart to a point where they can no longer (properly) communicate with each other, turning on the PA/LNA circuit can boost signal strength to resume the communication.

Additionally, FIG. 5 shows more data points being collected after turning on the PA/LNA circuit. In an example, the power amplifier in the PA/LNA circuit powers the signal so that the LQI value at the receiver becomes greater than 110 (at data points 11 and beyond). In this case, the output power of transmitter in CC2430 IC module is reduced stepwise so that the LQI value can be brought back to the valid range. Eventually, at data point 23, the LQI value returns to about 95 as the output power is reduced continuously. Thus, the communication between the two ZigBee modules is established with good link quality and at the same time with substantial power savings.

Figure 6:
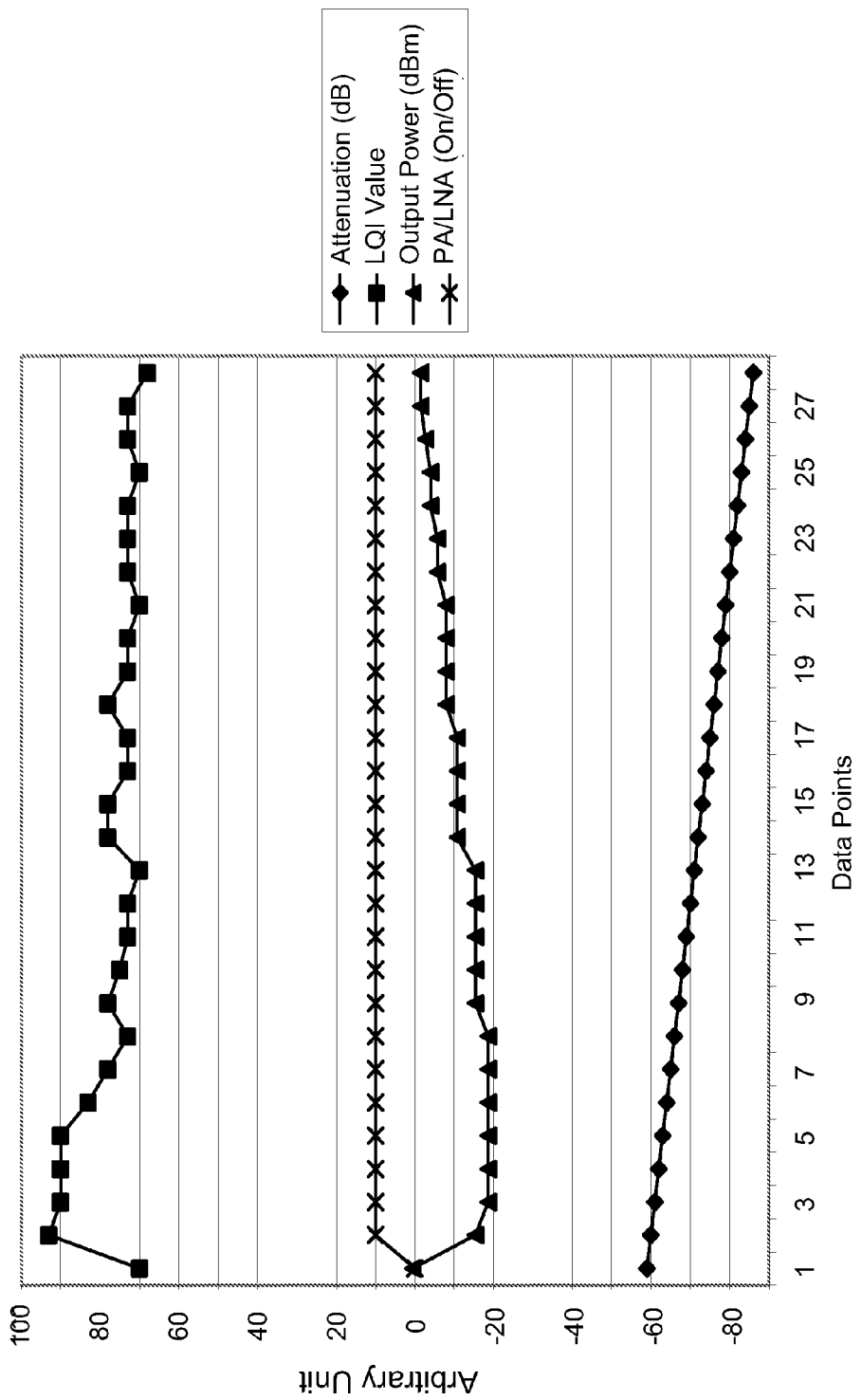
FIG. 6 is a chart illustrating an embodiment of using the testing system shown in FIG. 4 by increasing transmitter output power while keeping the PA/LNA circuit ON for maintaining LQI within the valid range.

FIG. 6 is a chart illustrating an embodiment of using the testing system shown in FIG. 4 by increasing transmitter output power while keeping the PA/LNA circuit ON for maintaining LQI within the valid range. This diagram is merely an example, which should not unduly limit the scope of the claims herein. One of ordinary skill in the art would recognize many variations, alternatives, and modifications. As shown, the Test 2 illustrates how the firmware embedded in ZigBee IC module changes its output power to keep the ZigBee module performing with a valid LQI value range. In particular, in this test the PA/LNA circuit is kept at ON state all time after data point #2. Correspondingly a LQI value equals about 93 at the data point #2. As the two ZigBee devices moves apart, simulated by keeping increasing the attenuation value from about −60 (dB) to about −85 (dB), the LQI value starts to fall from about 90 to near 70. The Test 2 shows that the testing system automatically adjust (increase) the ZigBee module next output power level whenever the LQI value is near or at 70 at the data point #8, #13, #17, #21, #23, #25, etc. As the results, the LQI value is prevented from falling under 70.

Figure 7:
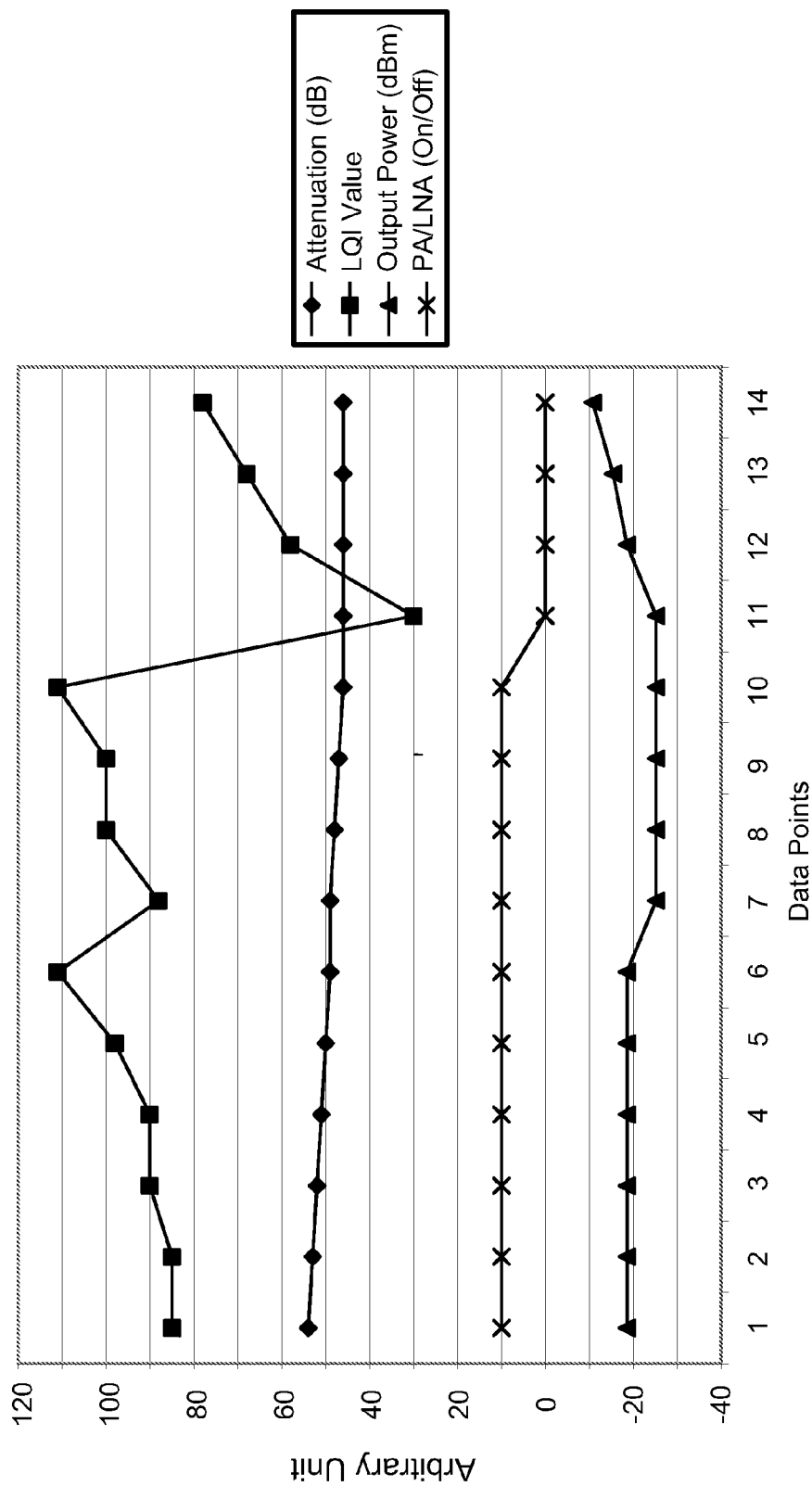
FIG. 7 is a chart illustrating an embodiment of using the testing system shown in FIG. 4 by turning off the PA/LNA circuit for maintaining LQI within the valid range.

FIG. 7 is a chart illustrating an embodiment of using the testing system shown in FIG. 4 by turning off the PA/LNA circuit for maintaining LQI within the valid range. This diagram is merely an example, which should not unduly limit the scope of the claims herein. One of ordinary skill in the art would recognize many variations, alternatives, and modifications. As shown, the Test 3 illustrates the testing system automatically turning off the PA/LNA circuit to reduce power when the LQI value reaches a high threshold. In particular, the attenuator is reducing its value so that the attenuation value dropping from about 54 (dB) to about 46 (dB) to simulate the two ZigBee devices moving closer towards each other. Therefore, the LQI value from the receiver perspective becomes larger and larger. At the data point #6, the LQI value reaches high threshold 110. After this, the output power of the transmitter is firstly reduced to bring the LQI value down, achieving power savings accordingly. Furthermore, at data point #10, the LQI value reaches 110 again while the transmitter output power reaches its minimum level. At the next point, the PA/LNA circuit is turned off to reduce output power of the signal sent to the receiver where the LQI value is substantially reduced.

In fact, at the data point #11, the LQI value is found to be 30, too small compared to the desired minimum value of 70. From this data point on, while the PA/LNA circuit is kept OFF, the output power of the transmitter is increased, intending to raise the LQI value. At the data point #14, the LQI value becomes about 78, within the valid range.

While the above is a full description of the specific embodiments, various modifications, alternative constructions and equivalents may be used. Although the above has been described using a selected sequence of steps, any combination of any elements of steps described as well as others may be used. Additionally, certain steps may be combined and/or eliminated depending upon the embodiment. Of course there can be other variations, modifications, and alternatives. Therefore, the above description and illustrations should not be taken as limiting the scope of the present invention which is defined by the appended claims.

What is claimed is:

1. A method for automatically adjusting signal output power and receiving sensitivity of a ZigBee wireless module, the method comprising:
    sending a signal with an output power from a transmitter comprising a ZigBee module to a receiver, the ZigBee module comprising a PA/LNA circuit including a power amplifier PA and a low noise amplifier LNA, the output power from the transmitter being adjustable between a minimum level and a maximum level;
    receiving a return message by the ZigBee module, the return message including a Link Quality Indicator (LQI) generated by the receiver, the LQI based on a signal strength of the signal at the receiver;
    if the LQI is not inclusively within a predetermined range between a maximum value and a minimum value, adjusting the output power for sending a next signal; and
    further adjusting the PA/LNA circuit of the ZigBee module for maintaining the LQI within the predetermined range if the output power from the transmitter has reached the minimum level or the maximum level.

2. The method of claim 1 wherein the signal comprises a data packet wirelessly transmitted from a RF antenna of the ZigBee module.

3. The method of claim 1 wherein the signal strength at the receiver is indicated by a standard Receiving Signal Strength Indicator (RSSI).

4. The method of claim 3 wherein the LQI is based on the RSSI.

5. The method of claim 4 wherein the minimum value is 70 and the maximum value is 110.

6. The method of claim 1 wherein the adjusting the output power comprises:
    increasing the output power up to the maximum level if the LQI is smaller than the minimum value;
    sending the next signal from the ZigBee module to the receiver;
    measuring a signal strength of the next signal by the receiver; and
    determining by the receiver whether next value of the LQI based on the signal strength is inclusively within the predetermined range.

7. The method of claim 6 wherein the further adjusting the PA/LNA circuit of the ZigBee module comprises:
    turning on the PA after determining that the LQI is still smaller than the minimum value after the output power reaches the maximum level; and
    broadcasting a warning message to indicate that the receiver is too far apart from the ZigBee module, if the LQI is still smaller than the minimum value after turning on the PA.

8. The method of claim 1 wherein the adjusting the output power further comprises:
    decreasing the output power down to the minimum level if the LQI is greater than the maximum value;
    sending the next signal from the ZigBee module to the receiver;
    measuring a signal strength of the next signal at the receiver; and
    determining by the receiver whether next value of the LQI based on the signal strength is inclusively within the predetermined range.

9. The method of claim 8 wherein the further adjusting the PA/LNA circuit of the ZigBee module comprises:
    turning off the PA after determining that the LQI is still greater than the maximum value after the output power reaches the minimum level; and
    sending a warning message to indicate that no further power saving for the ZigBee module if the LQI is still greater than the maximum value after turning off the PA.

10. The method of claim 1 wherein the ZigBee module comprises a receiver for receiving a wireless signal sent by another ZigBee module.

11. The method of claim 10 wherein the adjusting the PA/LNA circuit of the ZigBee module further comprises turning on the LNA to raise signal sensitivity of the received wireless signal.

12. A method for automatically adjusting output power of a wireless signal sent from a first wireless module to a second wireless module, the method comprising:
    sending a first packet with a first signal strength to the second wireless module, the first packet being sent with a first transmit power by the first wireless module, the first wireless module having a power amplifier and a low noise amplifier (PA/LNA) circuit for adjusting signal output power;
    determining whether a link quality indicator (LQI) is between a low threshold and a high threshold, the LQI based on the first signal strength;
    if the LQI is determined to be greater than the high threshold, determining whether the first transmit power is set to a minimum level;
    if the first transmit power is higher than the minimum level, reducing the first transmit power to a second transmit power for sending a second packet from the first wireless module;
    if the first transmit power is set to the minimum level, determining whether the PA/LNA circuit associated with the first wireless module is in ON state;
    if the PA/LNA circuit is in an OFF state, displaying a first warning message indicating that no further power saving for the first wireless module;
    if the PA/LNA circuit is in an ON state, turning off the PA before sending a third packet with a third transmit power, the third transmit power being smaller than the first transmit power.

13. The method of claim 12 further comprising:
- if the LQI is determined to be less than the low threshold, determining whether the first transmit power is set to a maximum power;
- if the first transmit power is less than the maximum level, increasing the first transmit power to a fourth transmit power for sending a fourth packet from the first wireless module;
- if the first transmit power is set to the maximum level, determining whether the PA/LNA circuit associated with the first wireless module is in ON state;
- if the PA/LNA circuit is in OFF state, turning on the PA before sending a fifth packet with a fifth transmit power, the fifth transmit power being greater than the first transmit power;
- if the PA/LNA circuit is in ON state, displaying a second warning message indicating that the second wireless module is too far apart from the first wireless module.

14. The method of claim 12 wherein the LQI can be defined as a relative value proportional to a standard receiving signal strength indicator (RSSI) determined by the second wireless module.

15. The method of claim 12 wherein the high threshold of the LQI can be set to 110 and the low threshold of the LQI can be set to 70.

16. The method of claim 12 wherein the reducing the first transmit power to a second transmit power comprises lowering an output power from a transmitter in the first wireless module each time following a predetermined power level table till that the minimum level is reached.

17. The method of claim 12 further comprising determining whether the LQI associated with the second packet or the third packet is within the low threshold and the high threshold.

18. The method of claim 13 wherein the increasing the first transmit power to a fourth transmit power comprises raising an output power from a transmitter in the first wireless module each time following a predetermined power level table till that the maximum level is reached.

19. The method of claim 13 further comprising determining whether the LQI associated with the fourth packet or the fifth packet is within the low threshold and the high threshold.

20. A computer program product comprising a readable storage medium containing instructions that, when executed on a computing device, define a ZigBee module for automatically adjusting signal output power, the instructions comprising:
- instructions for processing a receiving strength of a wireless signal packet to determine whether a link quality indicator (LQI) is within a valid range between a low threshold and a high threshold;
- instructions for increasing transmitter output power if the LQI is less than the low threshold;
- instructions for turning on a power amplifier/low noise amplifier (PA/LNA) circuit for maintaining the LQI within the valid range by boosting signal output power;
- instructions for decreasing transmitter output power if the LQI is greater than the high threshold; and
- instructions further for turning off the PA/LNA circuit, if it is in ON state, for maintaining the LQI within the valid range.

21. The computer program product of claim 20 further comprising broadcasting a warning message of no further power saving if the transmitter output power reaches a minimum level and the PA/LNA circuit is in OFF state.

22. The computer program product of claim 20 further comprising displaying a warning indicating that devices associated with the wireless signal packet are too far apart if the transmitter output power reaches a maximum level and the PA/LNA circuit is in ON state.

\* \* \* \* \*